2 Sheets--Sheet 1.
R. HAWKES & H. J. PAINE.
Spark-Arrester and Consumer.
No. 5,062. Reissued Sep. 17, 1872.
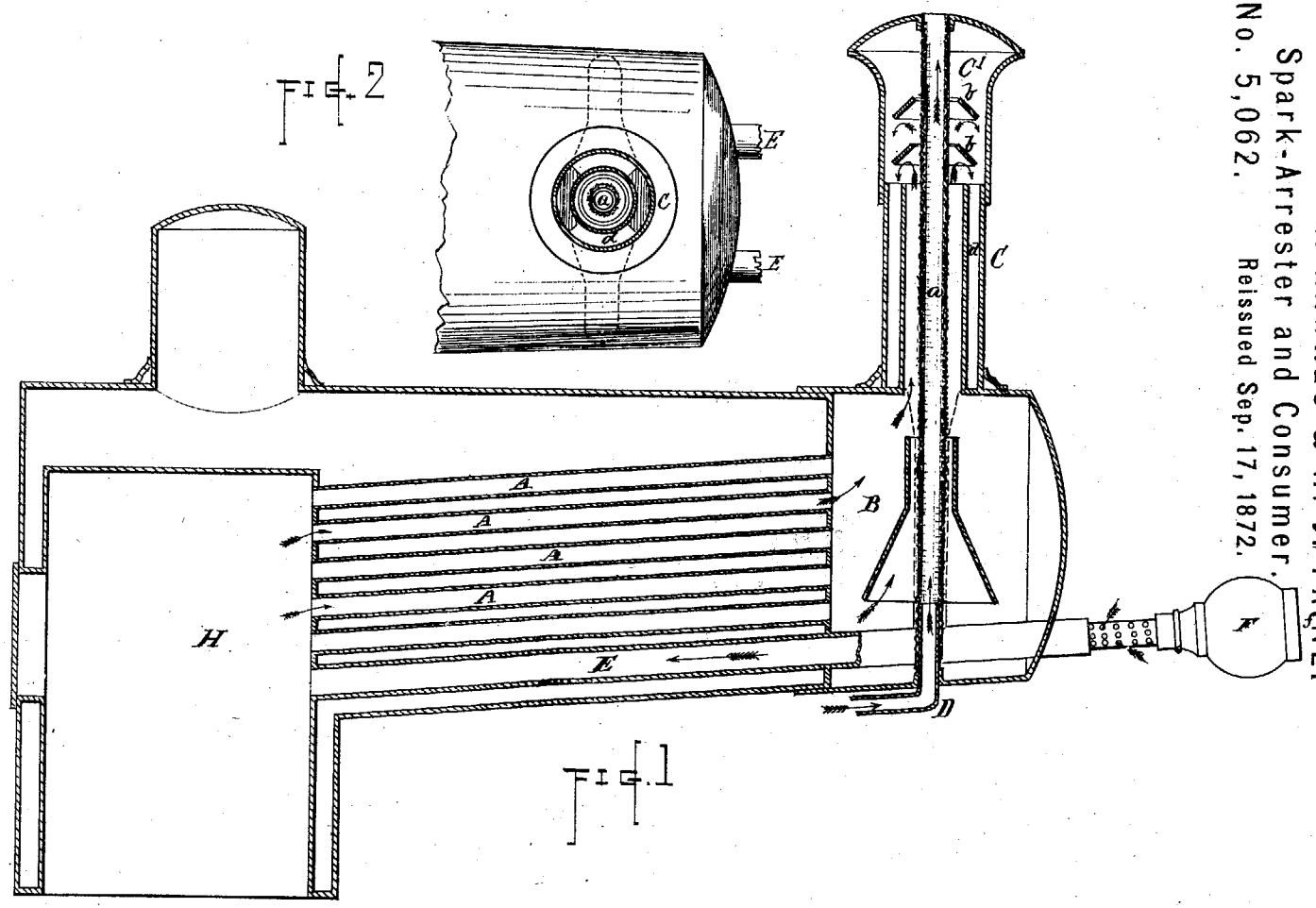
Witnesses
Chas. A. Burleigh
Thos. H. Dodge
Inventors
Russell Hawkes
Henry J. Paine
N. PETERS, PHOTO-LITHOGRAPHER, WASHINGTON, D. C.

2 Sheets--Sheet 2.

R. HAWKES & H. J. PAINE.

Spark-Arrester and Consumer.

No. 5,062. Reissued Sep. 17, 1872.

Witnesses

Chas. H. Burleigh

Thos. G. Dodge

Inventors

Russell Hawkes

Henry J. Paine

N. PETERS, PHOTO-LITHOGRAPHER, WASHINGTON, D. C.

UNITED STATES PATENT OFFICE.

RUSSELL HAWKES AND HENRY J. PAINE, OF PROVIDENCE, RHODE ISLAND, ASSIGNORS TO THEMSELVES AND JOSEPH KELLY.

IMPROVEMENT IN SPARK ARRESTERS AND CONSUMERS.

Specification forming part of Letters Patent No. 124,738, dated March 19, 1872; reissue No. 5,062, dated September 17, 1872

*To all whom it may concern:*

Be it known that we, RUSSELL HAWKES and HENRY J. PAINE, both of the city and county of Providence and State of Rhode Island, have invented certain new and useful Improvements in Spark-Arresters for Locomotive-Engines; and we do hereby declare the following to be a full, clear, and exact description of the same, reference being had to the accompanying drawing forming a part of this specification, and in which—

Figure 3:
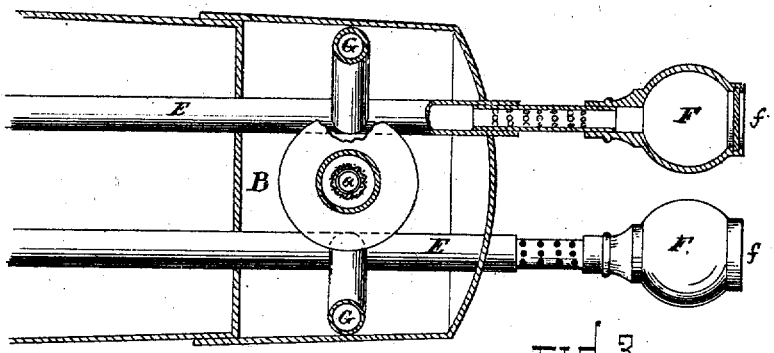
Figure 4:
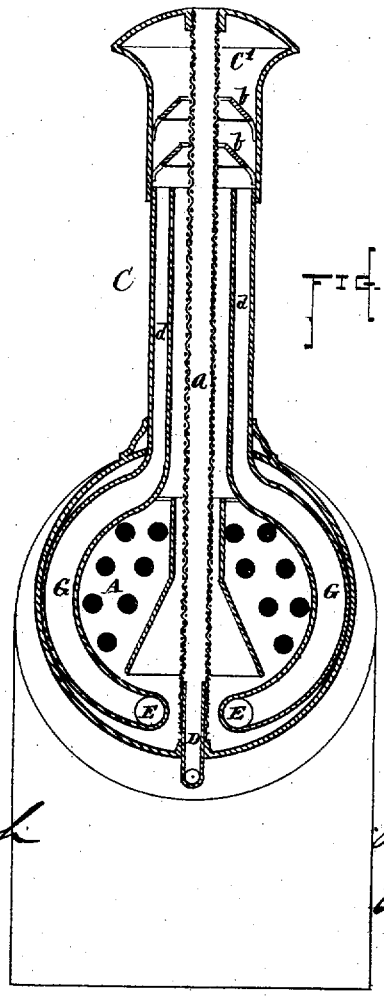

Figure 1 represents a longitudinal vertical section of such parts of a locomotive-engine as are necessary to illustrate our invention. Fig. 2 represents a horizontal section through the smoke-stack. Fig. 3 represents a horizontal section through the smoke-chamber and front end of the boiler, and Fig. 4 represents a transverse vertical section through the center of the smoke-stack.

In the drawing, the parts marked A A represent the smoke-flues of the locomotive-boiler, which convey the products of combustion from the fire-box to the smoke-chamber B, and from which the same escape through the smoke-stack C. The upper end of the stack C is closed, with the exception of a small aperture at the center, and from which aperture a pipe, *a*, of wire-gauze or perforated sheet metal, extends downward through the center of the stack and smoke-chamber B, and has its lower end connected with the steam-exhaust pipe D. The smoke and gas, when they reach the chamber B, are by the force of the exhaust, as well as by the ordinary draft and by their own impetus, caused to enter the perforated pipe *a* and ascend in the same to escape at the top of the stack. The sparks and cinders, however, of larger size than the apertures or meshes of the perforated pipe *a*, cannot pass into said pipe to escape; but they are, by the upward draft within the stack, carried up in the passage around the pipe *a*, and into the inclosed upper part C′ or head of the smoke-stack, and in which upper part are arranged inclined rings *b b*, which deflect the ascending sparks or cinders, and cause them to fall and enter the annular space or passage *d*, which passage is formed by arranging an upright cylindrical tube, *e*, within the tube or shell of the smoke-stack, as shown. The lower end of the space or passage *d* communicates with two (more or less) pipes, G G, which lead into a corresponding number of tubes or flues, E E, arranged in horizontal or slightly-inclined positions in the lower part of the boiler, and extending from the forward end thereof to the fire-box H, and by means of said flues E E the sparks and cinders which enter the space *d* will be conducted back into the fire-box for complete combustion. In order to create a draft in the pipes E E, to rapidly force the sparks and cinders backward therein, these pipes E are extended through the forward end of the engine, as shown, and openings or perforations formed therein, so that air can enter the front end of said pipes during the forward motion of the locomotive, and thus carry the cinders into the furnace, while at the same time a supply of oxygen is furnished to the fire to produce a more complete combustion of the gases within the fire-box. Since the pipes E E are open at both ends, we have thought it well to utilize the light from the fire, which shines through said pipes, by attaching to their front ends spherical reflectors F F, with glass faces *f f*. These will constitute signal-lights, which can be used for suitable purposes and occasions, and can be displayed without the aid of lamps or extra lights.

It will be seen from the foregoing description that our improvement in spark-arresters obviates many and the most serious objections to spark-arresters as made and used previous to our invention; for instance, one serious objection is the unsightly appearance of a locomotive having an old-fashioned spark-arrester attached to it. This is entirely remedied by our improvement, since the external appearance of the locomotive smoke-stack and boiler is not more objectionable than the appearance of the same would be without our improvement applied thereto. Then, again, the pipe or pipes which conduct the sparks or cinders from the bottom of the smoke-chamber to the fire-box are straight, whereby all liability of clogging is obviated, while at the same time the draft of external air through the pipe or pipes is direct, which also tends to insure a constant, rapid, and uniform return of the sparks to the fire-box to be there consumed. It will also be noticed that the pipes G, which communicate with the bottom of the spark-chamber *d*, have no abrupt curves or bends, and consequently they are not liable to clog up. But in case it should ever be necessary to clean the chamber *d*, pipes G, and pipes or flues E, the operation can be performed very expeditiously, and with but slight inconvenience, since all that the fireman would have to do, in order to obtain free access to the parts that require cleaning, would be to remove the cap or head of the smoke-stack and the reflectors F from the front ends of the pipes E, when the chamber *d* and the pipes connecting it with the fire-box can be cleaned with an ordinary cleaning-rod or scraper. Still another advantage resulting from the use of our improvement consists in the economy of fuel resulting from arranging all of the spark-arresting apparatus within the smoke-stack, chamber, and boiler, thereby, especially in the winter or colder part of the season, preventing the hot gases, cinders, and sparks from being cooled and deadened by passing in contact with cold and exposed pipes in their return from the smoke-stack to the fire-box. It will also be noticed that the application of our spark-arresting apparatus is very simple, and it can be applied even to old locomotives with but slight expense, while its construction is such that the space between the driving-wheels upon the outside of the fire-box is not obstructed, and said space can consequently be reserved for the application of the atmospheric-brake mechanism patented a few years ago, and which is now coming into very general use.

Having described our improvement in spark-arresters for locomotive-engines, what we claim as new and of our invention, and desire to secure by Letters Patent, is—

1. The combination, with the interior of the boiler and the smoke-stack in a locomotive, of one or more pipes or flues, G, and one or more pipes, E, connected with said flue or flues G, and open both in front and rear, substantially as and for the purposes set forth.

2. The combination, with the smoke-stack C in a locomotive, of a screen, *a*, for preventing the escape of the sparks or cinders, the pipe *e*, and the annular chamber *d*, extending from the top of the smoke-chamber to or near the lower part of the head or cap of the smoke-stack, all arranged substantially as and for the purposes set forth.

3. The combination of the pipes E E and G G, connected together, with the annular space *d* and perforated pipe *a*, all arranged as specified.

RUSSELL HAWKES.
HENRY J. PAINE.

Witnesses:
THOS. H. DODGE,
E. E. MOORE.